(12) United States Patent
Light

(10) Patent No.: US 6,271,854 B1
(45) Date of Patent: Aug. 7, 2001

(54) METHOD AND APPARATUS FOR FACILITATING NAVIGATION IN THREE-DIMENSIONAL GRAPHIC SCENES

(75) Inventor: John J. Light, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 08/990,228

(22) Filed: Dec. 15, 1997

(51) Int. Cl.[7] ................................................. G06T 15/10
(52) U.S. Cl. .......................... 345/427; 345/433; 345/355; 345/357; 345/157
(58) Field of Search .................................. 345/333, 334, 345/355, 157, 427, 419, 433, 357

(56) References Cited

U.S. PATENT DOCUMENTS

| | | | | |
|---|---|---|---|---|
| 5,528,735 | * | 6/1996 | Strasnick et al. ..................... | 345/427 |
| 5,555,354 | * | 9/1996 | Strasnick et al. ..................... | 345/427 |
| 5,680,152 | * | 10/1997 | Bricklin ................................ | 345/419 |
| 5,689,628 | * | 11/1997 | Robertson ............................. | 345/427 |
| 5,734,805 | * | 3/1998 | Isensce ................................. | 345/419 |
| 5,808,613 | * | 9/1998 | Marrin et al. ........................ | 345/355 |
| 5,841,440 | * | 11/1998 | Guba .................................... | 345/419 |

* cited by examiner

*Primary Examiner*—Mark Zimmerman
*Assistant Examiner*—Kimbinh T. Nguyen
(74) *Attorney, Agent, or Firm*—Blakely, Sokoloff, Taylor & Zafman LLP

(57) ABSTRACT

A method and apparatus for facilitating navigation in three-dimensional graphics scenes. As a user changes from one viewing position to another within these 3D scenes, an opportunistic control button is displayed on the computer screen for selection via a user-input device, such as a mouse. Selection of this control button enables the user to assume the viewing position that was observed immediately preceding the user's current viewing position. In one embodiment, the control button appears on the display directly under the cursor (i.e., mouse pointer) at the time that the current viewing position appears, regardless of where the cursor is located on the screen. Advantageously, the user is able to assume previously viewed positions within 3D scenes with relative ease.

15 Claims, 7 Drawing Sheets

METHOD AND APPARATUS FOR FACILITATING NAVIGATION IN THREE-DIMENSIONAL GRAPHIC SCENES

BACKGROUND OF THE INVENTION

1. Field of the Invention

The present invention relates generally to computer system applications, and, more particularly, to a method and apparatus for facilitating navigation in three-dimensional scenes in a computer graphics application via control options to a user.

2. Description of the Related Art

Three-dimensional graphics technology has become increasingly popular for a variety of purposes over the past several years. Currently, 3D graphics are used extensively in design-related applications such as architecture and engineering. They are also used in scientific investigations such as the re-creation of airplane crash disasters and for recreational-type activities such as computer games.

Three-dimensional graphics provide an individual with a realistic perspective of how various objects appear (and perhaps even dynamically inter-relate) in a virtual setting, providing a significant advantage over traditional two-dimensional graphics. As a result, three-dimensional graphics usage has undergone explosive growth and the sophistication of these graphics provide an indispensable tool for the user.

One significant limitation of three-dimensional graphics, however, is the movement and positioning of a user within a 3D scene, which is commonly referred to as navigation. Numerous factors contribute to the user's inability to effectively navigate in a 3D scene. For example, the use of inappropriate input devices for such navigation, inadequate visual feedback to the user, and limited user coordination has made 3D navigation both awkward and frustrating.

To alleviate the shortcomings associated with navigation, a technique known as functional (or task-orientated) navigation was developed. Functional navigation provides navigational aids to the user that relate to the user's position or purpose in the 3D scene. For example, selecting an object in a 3D scene (via a user-input device) could cause the user's viewing position in the scene to be automatically re-oriented to an appropriate viewing distance from the selected object. Such functional navigation essentially automates the traditional "manual" navigation process and has been pioneered by the computer game industry.

Although functional navigation has greatly improved a user's ability to navigate, it also suffers from several disadvantages. Currently, almost every action by the user in a 3D scene requires that the user reposition the cursor (or pointer) on the display screen. Whether done with a mouse, trackball, tablet, or some other means, positioning this cursor is one of the most time consuming and tiring operations associated with 3D graphics programs. First, the user must locate the cursor on the display screen. Then, the user has to reposition the cursor to a location on the screen to select a desired object or control. Typically, this involves "overshooting" the desired object or control, in which case, the user has to correct the overshoot to select the object or control. By performing such operations, the user suffers a cognitive discontinuity, concentrating more on positioning the cursor in the scene as opposed to concentrating on the 3D scene itself. Moreover, by selecting such object or control, the 3D scene changes. Thus, other objects that may have been viewed in the initial 3D scene (i.e., prior to selection), may no longer be visible in the newly generated 3D scene (i.e., subsequent to selection). Consequently, such objects that are no longer visible in the newly generated 3D scene become difficult to subsequently retrieve.

SUMMARY OF THE INVENTION

In one aspect of the present invention, a method is provided for controlling a viewing position within a coordinate space. The method includes determining a first viewing position within the coordinate space, determining a change to a second viewing position within the coordinate space, and displaying a first control representative of the first viewing position at the second viewing position.

In another aspect of the present invention, an apparatus includes a processor that determines a first viewing position within a coordinate space, and determines a change to a second viewing position within the coordinate space. The apparatus further includes a display that displays a first control representative of the first viewing position at the second viewing position.

BRIEF DESCRIPTION OF THE DRAWINGS

Other objects and advantages of the invention will become apparent upon reading the following detailed description and upon reference to the drawings in which.

Figure 1:
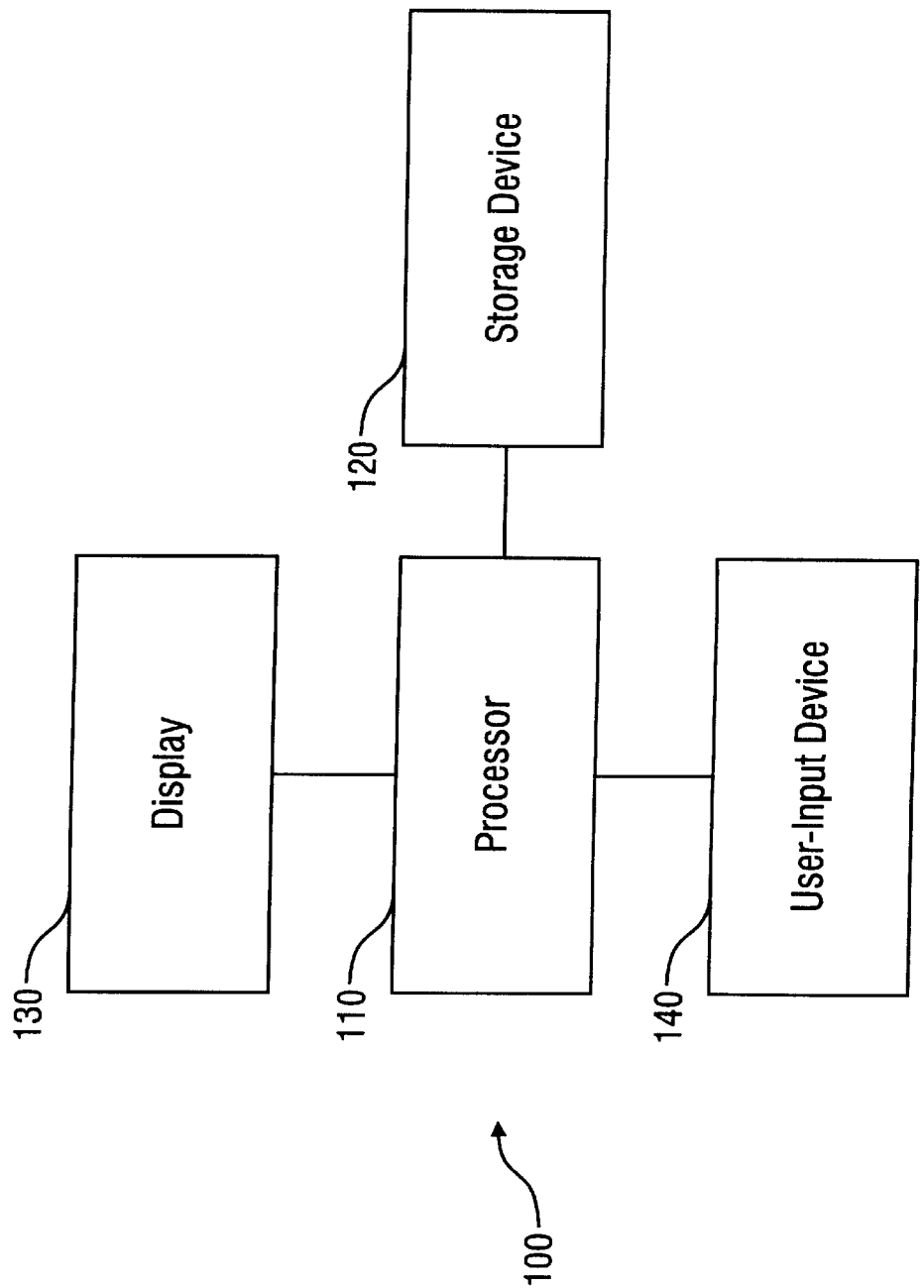
FIG. 1 is a block diagram of an apparatus for facilitating navigation within a particular three-dimensional scene of a 3D space in accordance with the present invention.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention.

DETAILED DESCRIPTION OF SPECIFIC EMBODIMENTS

Illustrative embodiments of the invention are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nonetheless be a routine undertaking for those of ordinary skill in the art having the benefit of this disclosure.

Turning now to the drawings, and specifically referring to FIG. 1, an apparatus 100 for generating three-dimensional graphics scenes and facilitating navigation within these 3D scenes is shown. The apparatus 100 comprises a processor 110, which renders the three-dimensional graphic scenes based upon a set of instructions from a computer graphics application program stored in a storage device 120, such as a disk, CD-ROM, hard drive, etc. The specific process by which the processor 110 renders these three-dimensional graphic scenes is well known to those of ordinary skill in the art. Accordingly, the specifics of such process will not be discussed herein to avoid obscuring the invention.

Once a particular three-dimensional graphics scene is rendered, the processor 110 displays the 3D scene on a display 130 for visual presentation to a user. The apparatus 100 further includes a user-input device 140, which permits the user to navigate through the three-dimensional graphics scene. In the illustrated embodiment, the user-input device 140 is a computer mouse. However, it will be appreciated that the user-input device 140 could be embodied as various other types of input devices, such as, for example, a trackball, touchpad, tablet, keyboard, touchscreen, joystick, etc. without departing from the spirit and scope of the present invention. It will also be appreciated that the user-input device 140 could also be embodied as a combination of some of the aforementioned input devices.

Figure 2A:
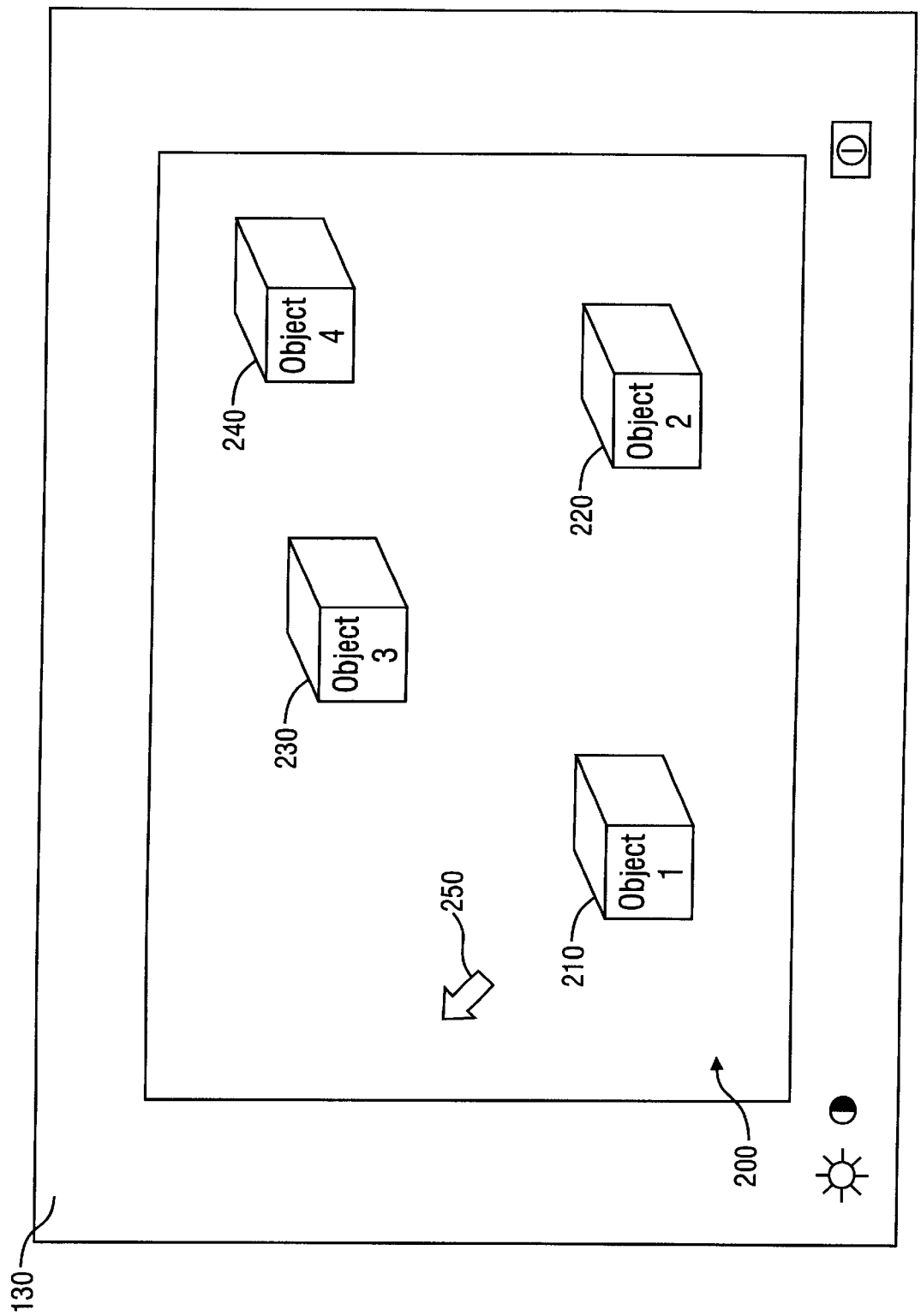
FIGS. 2A–C show various three-dimensional scenes (i.e., visual perspectives of the 3D space) on a display of the apparatus in FIG. 1.

Turning now to FIG. 2A, a generic three-dimensional scene 200, which is rendered by the processor 10, is shown on the display 130. The 3D scene 200 includes a plurality of 3D objects 210–240, which could represent a myriad of items. For example, the 3D scene 200 may represent a room of a house and the 3D objects 210–240 may be various pieces of furniture within the room. Of course, this particular example is for illustration purposes only and the 3D scene 200, as well as the 3D objects 210–240 present therein, could represent virtually anything. It should be further noted that the 3D scene 200 could comprise any number of objects and not necessarily be limited to the four objects 210–240 as shown.

The 3D scene 200 creates a realistic perspective of a 3D space (for example, the room of a house) and gives the user the impression that he or she is actually present within the 3D space, even though in reality he or she is not. Essentially, the 3D scene 200 is what the user would see through his or her own eyes when assuming a particular viewing position within the 3D space. An explanation of what is meant by the user's "viewing position" and how it relates to the 3D scene 200 will be better understood from the description as set forth below.

Figure 3C:
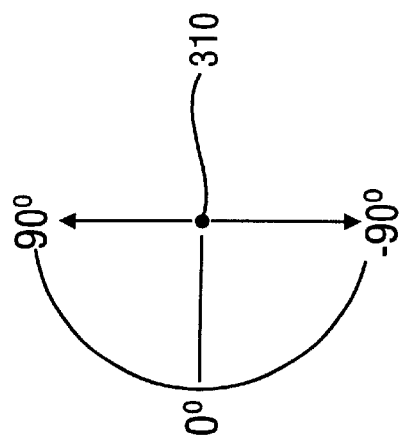
FIGS. 3A–C show various components that define a viewing position of a user within the 3D space.
Figure 3B:
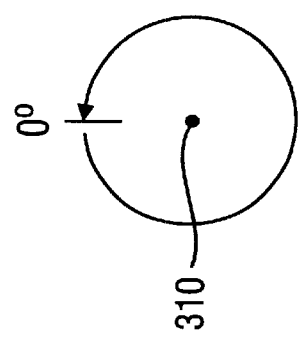
Figure 3A:
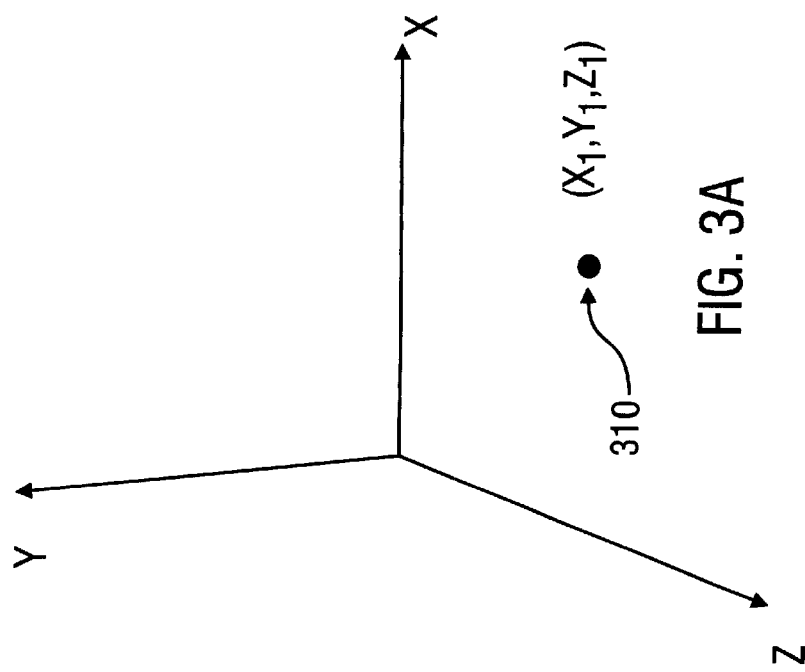

Referring to FIG. 3A, the user's "physical" position in the 3D space is represented by a point 310 that has coordinates $(x_1, y_1, z_1)$. These coordinates specifically indicate where the user is standing within the 3D space. However, even if the user is standing still at point 310, he or she can assume a multitude of different viewing positions of the 3D space by turning his or her body 360 degrees as shown in FIG. 3B or by rotating his or her head in a horizontal fashion (though head movement is restricted to roughly 180 degrees). The user can also assume different viewing positions by rotating his or her head in a vertical fashion from approximately −90 degrees to +90 degrees relative to the horizon (i.e., zero degrees) as shown in FIG. 3C. Accordingly, all of these components of FIGS. 3A–C (i.e., the points $x_1, y_1, z_1$, the horizontal viewing angle, and the vertical viewing angle) collectively form a position vector, which represents the user's viewing position within the 3D space. Thus, this viewing position vector determines what is actually observed in the 3D scene 200.

Referring back to FIG. 2A, the user can change his or her viewing position, to obtain various different visual perspectives of the 3D space, by navigation via the user-input device 140. This may be achieved by traditional navigation techniques that are well established in the art. Of these traditional navigation techniques, functional (or task-oriented) navigation provides navigational aids to the user to ease the navigation process. For example, if the user desired to view the 3D object 230 in more detail, the user would position a cursor 250 (e.g., a mouse pointer) on the object 230 (via the user-input device 140) and select it by clicking on the left mouse button, for example. Such selection would then cause the processor 110 to change the user's viewing position of the 3D space such that the object 230 appears in the center of the display 130, as is shown in the 3D scene 260 of FIG. 2B. Essentially, such functional navigation causes the processor 110 to automatically navigate the user to an appropriate viewing distance from the object 230.

Subsequent to viewing the object 230, the user may desire to view the other objects (i.e., the objects 210, 220, 240) of the 3D space in more detail as well. However, accessing these other objects 210, 220, 240 via traditional navigation techniques can be arduous to the user while viewing the 3D scene 260 of FIG. 2B. The objects 210, 220 are no longer viewable in the 3D scene 260 and, thus, are not readily accessible for selection by the user. That is, even though the objects 210, 220 are still present within the 3D space, they appear behind the user's current viewing position. Consequently, if the user would want to view these objects 210, 220 through traditional navigation methods, the user would have to inconveniently navigate the 3D space to bring back the objects 210, 220 into view. And, when the objects 210, 220 come back into view, the objects 230, 240 will most likely disappear, thus making subsequent viewing of those objects 230, 240 difficult to achieve as well.

To alleviate this problem, the present invention employs an "opportunistic" control 270, which permits the user to return to a 3D scene that was previously viewed by the user (e.g., the 3D scene 200 of FIG. 2A). In one embodiment, the control 270 appears on the display 130 directly under the cursor 250 at the time that the current 3D scene appears, regardless of where the cursor 250 is located on the display 130. The control 270 is relatively small in size, but, large enough to be viewable under the cursor 250. Thus, the control 270 will hardly obstruct viewing within the 3D scene 260. As opposed to the control 270 being positioned directly underneath the cursor 250, it could alternatively appear within close proximity of the cursor 250.

When selected by the user via the user-input device 140, the control 270 causes the processor 110 to automatically re-generate the previously viewed 3D scene (i.e., the 3D scene 200 of FIG. 2A). Such selection by the user could be accomplished by merely clicking the left mouse button of the user-input device 140, for example. Thus, by selection of the control 270, the user is returned to the viewing position corresponding to the 3D scene 200 of FIG. 2A with one simple step (e.g., the click of a mouse button). This simple action by the user reduces the likelihood of the user losing his or her concentration of the 3D scene, which would most likely occur if the user had to manually navigate to such viewing position using the traditional navigation methods. Moreover, the time expended to retrieve this previously viewed position is significantly less with the control 270 than that of the traditional navigation methods.

In one embodiment, the life of the control 270 (i.e., its appearance on the display 130) is relatively short and will only last until some other predetermined action is performed by the user. For example, the control 270 may disappear if some other navigation step were performed or if the cursor 250 were moved away from the control 270 by a predetermined distance via the user-input device 140. Furthermore, in the illustrated embodiment, the control 270 has meaning only within the context of a specific temporal sequence performed by the user. That is, when the control 270 appears in the scene 260 of FIG. 2B, its purpose would be to return to the previous viewing position corresponding to the 3D scene 200 of FIG. 2A. After returning to the 3D scene 200 of FIG. 2A, another control may appear under the cursor 250 in the scene 200, which would have a purpose to return to the 3D scene 260 of FIG. 2B.

Figure 2B:
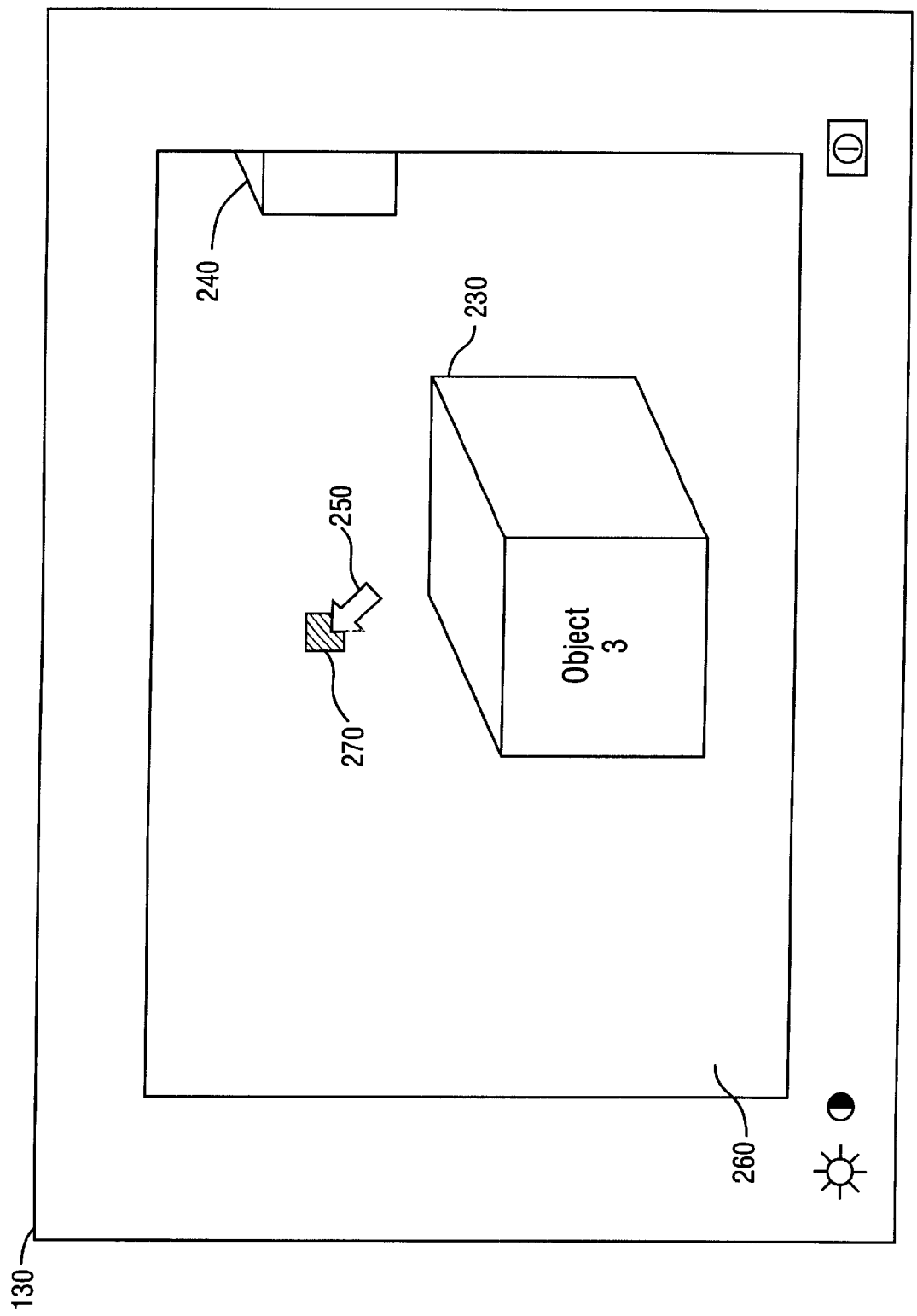
Figure 2C:
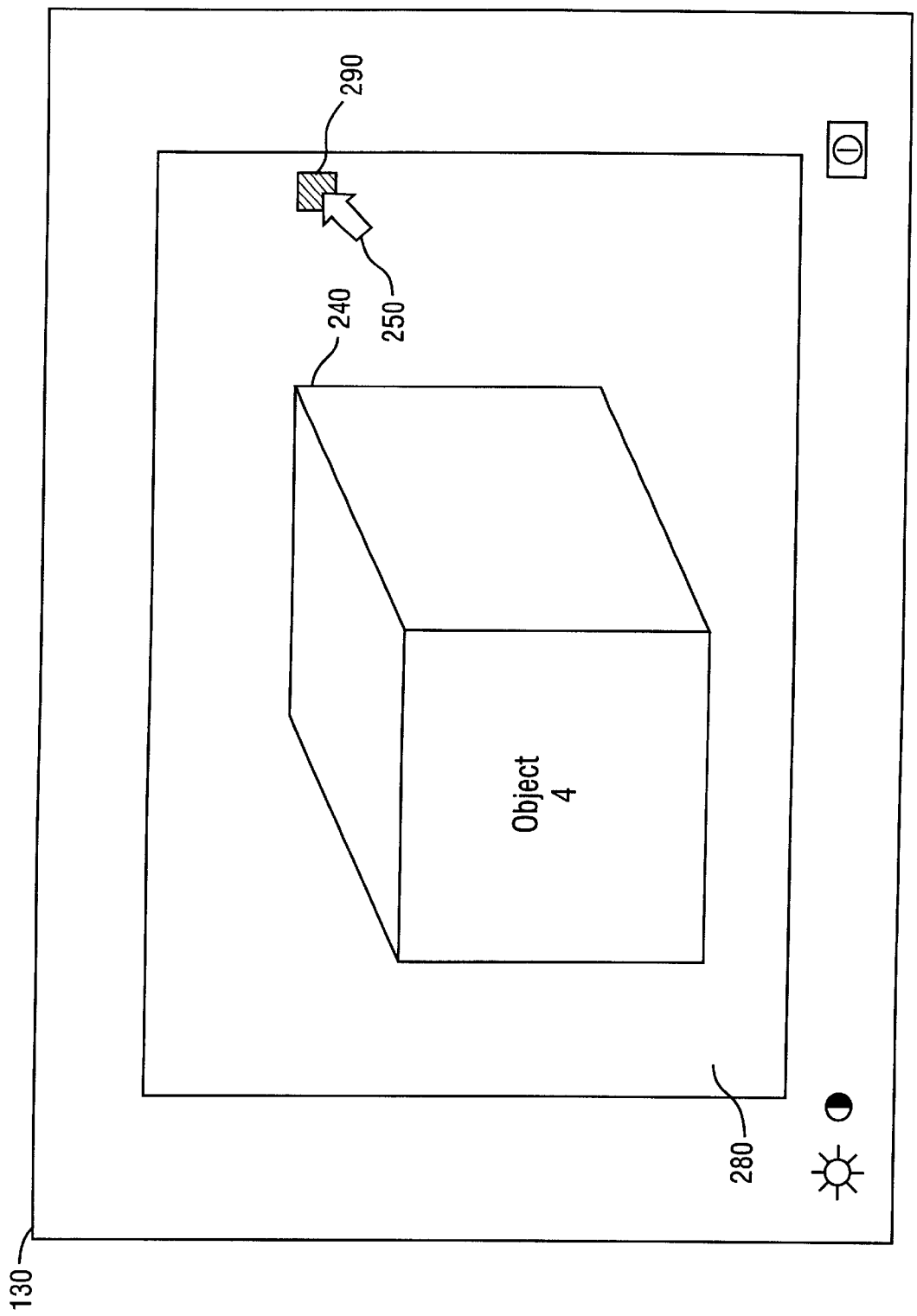

If the user selected the object 240 instead of the control 270 (subsequent to selecting the object 230), the processor 110 would generate a new 3D scene 280, with the object 240 being centered in the display 130 (as shown in FIG. 2C). The processor 110 would also generate another control 290, which, if selected by the user, would cause the processor 110 to re-generate the 3D scene 260 of FIG. 2B. The user could also return to the viewing position corresponding to the 3D scene 200 of FIG. 2A, if so desired, by selecting the control 270 (once it appears in the re-generated 3D scene 260 of FIG. 2B).

In an alternative embodiment, once the processor 110 has re-generated the 3D scene 260 of FIG. 2B, the user could also have the option to return to the viewing position corresponding to the 3D scene 280 of FIG. 2C. This option would be in addition to the option of returning to the viewing position of 3D scene 200 of FIG. 2A (as previously discussed). That is, the control 270 of FIG. 2B would have a dual purpose. The user could indicate his or her desire to re-generate the 3D scene 200 of FIG. 2A by performing a first user input (such as a left-button mouse click) made on the user-input device 140 or desire to re-generate the 3D scene 280 of FIG. 2C by performing a second user input (such as a right-button mouse click) made on the user-input device 140, for example.

By use of the control 270, 290, the user is able to quickly assume previous viewing positions for subsequent viewing and/or manipulation of the 3D objects 210–240 within the 3D space. The control 270, 290 is conveniently placed under the cursor 250 such that no movement of the cursor 250 is required. The user merely has to click a button to assume such previous viewing positions and, thus, saves considerable time navigating the 3D space over traditional navigation methods.

In an alternative embodiment, instead of displaying a single control 270, 290, the processor 110 could be configured to display a plurality of controls at the same time. For example, a predetermined number of small buttons in a row or a square of nine controls may appear within the 3D scene 200, 260, 280. Accordingly, the user could select the viewing position previously assumed by clicking directly on the control button corresponding to the desired viewing position. This would permit the user to "skip" through or prevent the viewing of 3D scenes that appear intermediate between the currently viewed 3D scene and the desired 3D scene. For example, if the 3D scene 280 of FIG. 2C is currently being viewed by the user, and the user desires to return to the 3D scene 200 of FIG. 2A, the user would select the control 270 (of the two controls 270, 290 displayed simultaneously) to return to the 3D scene 200 of FIG. 2A. Advantageously, the user would not have to intermediately return to the 3D scene 260 of FIG. 2B to get to the desired scene 200 of FIG. 2A.

Since in this embodiment a plurality of controls are simultaneously displayed, the controls could each be labeled, indicating the corresponding viewing position the control represents. For example, if the object 230 were a table and the object 240 were a chair, the controls (corresponding to such objects 230, 240) could each be respectively labeled "table" and "chair" to provide a reminder to the user. Furthermore, to keep the controls small in size (i.e., to prevent too much visual obstruction within the 3D scene 200, 260, 280), the labels could temporarily appear by simply placing the cursor 250 over one of the controls (i.e., using a "brushing" technique).

In this "multiple" control embodiment, since the controls are placed adjacent one another, cursor 250 movement between the controls is minimal. Thus, the negligible amount of cursor 250 movement encountered in this embodiment may well be worth the effort by not requiring the user to step through intermediate 3D scenes as in the "single" control embodiment.

Figure 4A:
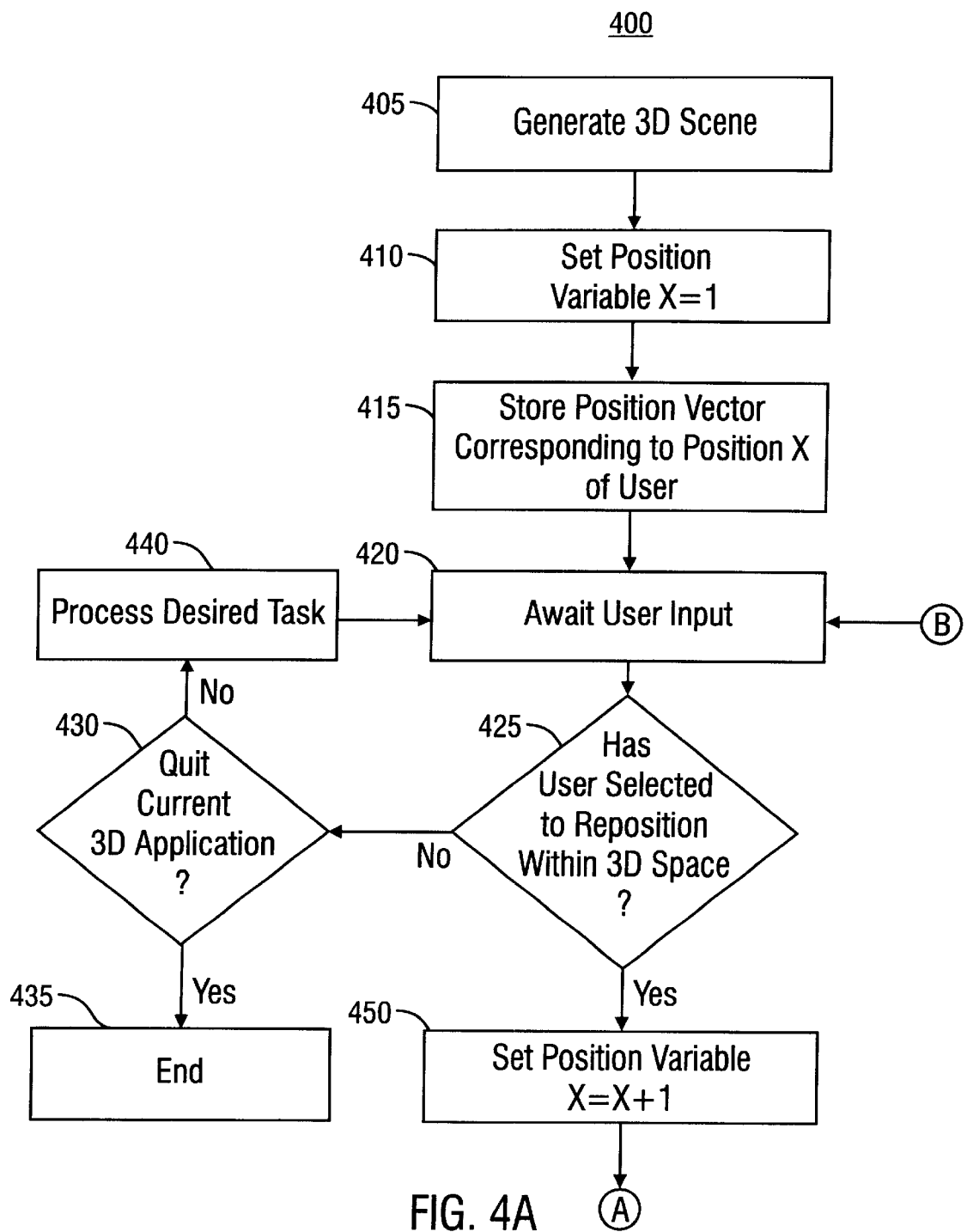
FIGS. 4A and B show a process executed by the apparatus of FIG. 1 for facilitating navigation within the three-dimensional scenes.
Figure 4B:
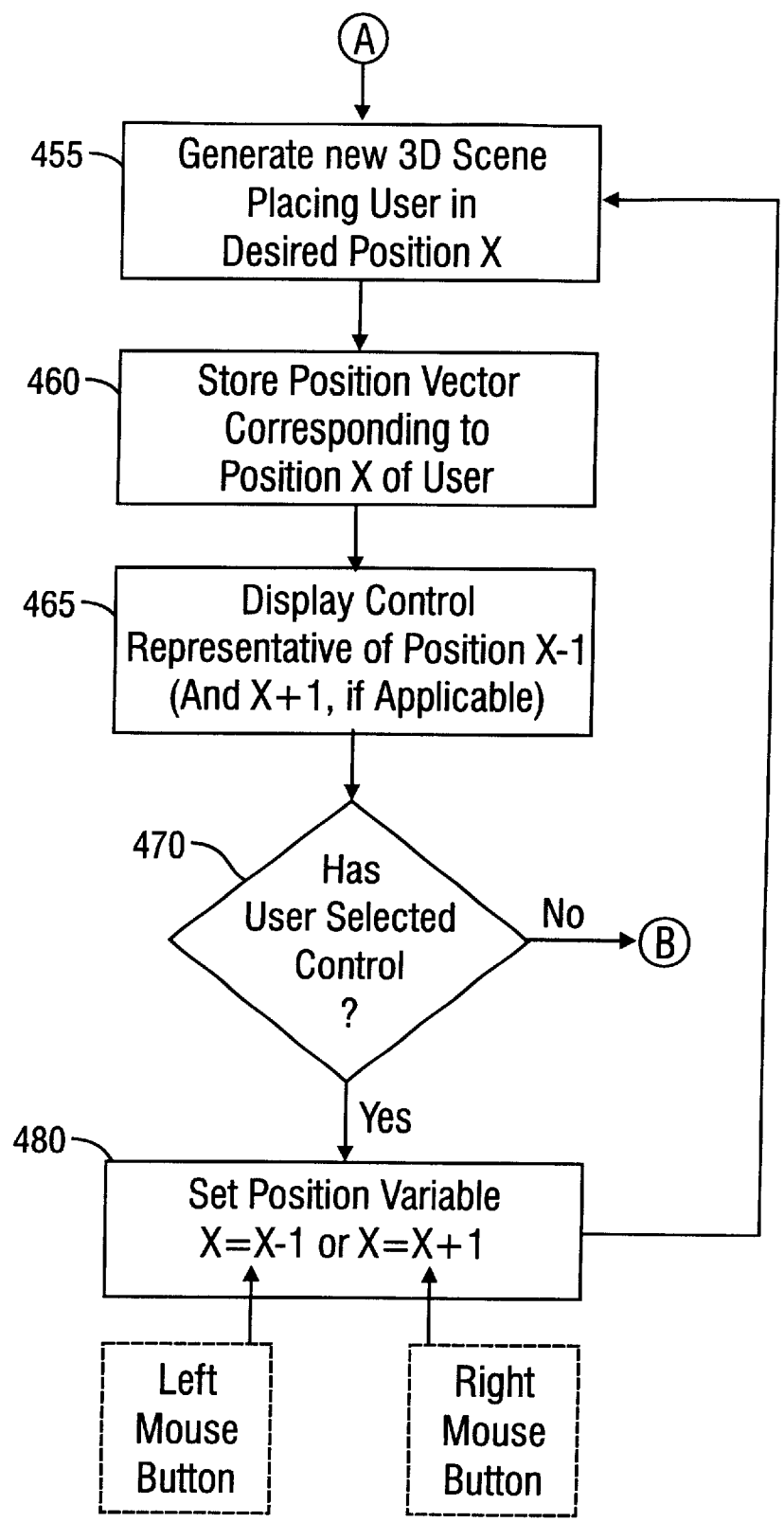

Turning now to FIGS. 4A and B, a flowchart is shown depicting a process 400 executed by the apparatus 100 of FIG. 1 for facilitating navigation in a 3D scene. The process 400 commences at step 405, where the processor 110, having a computer graphics application running thereon, initially generates the 3D graphics scene 200 of FIG. 2A for visual presentation to the user via the display 130. The 3D scene 200 corresponds to one particular viewing position within the 3D space of which the user is virtually a part. The user can alter his or her viewing position within the 3D space (i.e., navigate) to obtain various different visual perspectives of objects 210–240 present within such 3D space. The manner in which the user changes his or her visual position within the 3D space could be by traditional navigational methods as previously discussed.

The processor 110 initializes a position variable "x" at step 410 to indicate the first visual position assumed by the user within the 3D space. In the example provided, the 3D scene 200 of FIG. 2A would be the first visual position of the user within the 3D space. As the user moves from one visual position to another, the position variable x is incremented to reflect each new visual position of the user. Thus, following with the example, the 3D scene 260 of FIG. 2B would be the second visual position assumed by the user, the 3D scene 280 of FIG. 2C would be the third, and so forth. Subsequent to initializing this position variable x, the processor 110 stores a position vector (as previously discussed) at step 415, which describes the orientation of the user (i.e., the user's viewing position) of the 3D space that corresponds to each position x assumed by the user. Thus, by storing this position vector, the processor 110 will be able to regenerate a particular 3D scene 200, 260, 280, if subsequently desired again by the user.

After storing the position vector corresponding to the particular viewing position (i.e., position x), the processor 110 awaits input from the user via the user-input device 140 at step 420. If an input is received, the processor 110 determines if the user desires to reposition him or herself within the 3D space at step 425. Such desire to reposition could be determined by the user selecting a particular object within the 3D space or by some other predetermined action performed by the user. If the processor 110 determines that the user does not desire to reposition within the 3D space, it is then determined if the user desires to quit the 3D application at step 430. If the user has indicated the desire to quit the 3D application, the process 400 ends at step 435. However, if the user's input did not indicate the desire to quit the 3D application, the process 400 continues to step 440, where the processor 110 carries out the desired task input by the user and reverts back to step 420 to await further input by the user.

If it was determined at step 425 that the user desires to reposition within the 3D space, the process 400 continues to step 450, where the processor 110 increments the position variable x by one to indicate the next visual position assumed by the user within the 3D space. Subsequent to incrementing the position variable x, the processor 110 changes the user's visual orientation of the 3D space by generating a new 3D scene corresponding to the visual position x assumed by the user at step 455. The processor 110 then subsequently stores, at step 460, the position vector corresponding to the new position x of the user within the 3D space.

After the user has been placed in the new position x and its corresponding position vector has been stored, the processor 110, at step 465, displays the control 270, 290, which represents the visual position immediately proceeding the current position x (i.e., the position x−1) of the user. In an alternative embodiment, the control 270, 290 could represent the position x−1 and x+1 (i.e., those previous visual positions immediately proceeding and immediately subsequent to the current position x). The position x+1 would only be applicable if the user had previously selected the control 270, 290.

At step 470, it is determined if the user has selected the control 270, 290 via the user-input device 140. As previously discussed, the control 270, 290 is placed underneath the cursor 250 and the user can select the control 270, 290 by merely clicking the left mouse button of the user-input device 140, for example. If the control 270, 290 plays a dual role by representing the positions x−1 and x+1, the right mouse button could be used to select the position x+1 and the left mouse button would remain dedicated for obtaining the position x−1.

If the user did not select the control 270, 290 in step 470, the process reverts back to step 420, where the processor 110 awaits further input by the user. If, however, the user had selected the control 270, 290 in step 470, the processor 110 either decrements or increments the current position variable x, depending whether the left or right mouse button, respectively, was actuated by the user. Subsequent to decrementing or incrementing the current position variable x, the process 400 reverts back to step 455, where the processor 110 places the user back to the desired visual position and generates its corresponding 3D scene 200,260, 280.

The opportunistic control need not necessarily be used to return the user to a previous viewing position within the 3D scene as previously described, but could be alternatively configured to perform other functions. For example, when a user navigates from a first object to a second object within a particular scene, a control could appear that would have the meaning to change the appearance of the second object. Such change in appearance could be, for example, "shadowing" the second object as an indication that such object has been viewed by the user in the scene. Furthermore, as yet another example, selection of the control could be to allow the user to see through the second object (i.e., "X-ray" vision), such that the user could view other objects in the scene that are obstructed by the second object. Thus, selection of such control could cause the second object to go from an "opaque" (visual-obstruction) state to a "transparent" (non-visual-obstruction) state.

While the present invention has been described in connection with three-dimensional computer applications, it will be appreciated that alternative types of computer applications, such as, two-dimensional graphics applications or text-based applications, could similarly benefit from the opportunistic control technique without departing from the spirit or scope of the invention.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed is:

1. A method comprising:

displaying a plurality of three dimensional images in a first viewing position of a series of viewing positions;

displaying a cursor in each viewing position of the series of viewing positions;

displaying at least one image selection button in a last viewing position of the series of viewing positions, wherein each image selection button is associated with one of the viewing positions of the series of viewing positions;

displaying at least one of the plurality of three dimensional images in the last viewing position of the series of viewing positions;

moving the cursor in one of the displayed three dimensional images;

simultaneously moving the image selection button relative to the movement of the cursor; and selecting one of the image selection buttons in the last viewing position of the series of viewing positions, wherein selecting the image selection button displays one of the viewing positions of the series of viewing positions; and displaying the three dimensional image associated with the selected image selection button.

2. The method of claim 1 wherein displaying at least one image selection button further comprises displaying the image selection buttons underneath the cursor.

3. The method of claim 1 further comprising not displaying the image selection button after a period of times has elapsed.

4. The method of claim 1 further comprising not displaying the image selection button in response to an action performed by a user.

5. The method of claim 1 further comprising receiving signals from a user input device; and moving the cursor in response to the received signals.

6. A computer readable medium containing instructions which, when executed in a processing system, cause the system to perform a method comprising:

displaying a plurality of three dimensional images in a first viewing position of a series of viewing positions;

displaying a cursor in each viewing position of the series of viewing positions;

displaying at least one image selection button in a last viewing position of the series of viewing positions, wherein each image selection button is associated with one of the viewing positions of the series of viewing positions;

displaying at least one of the plurality of three dimensional images in the last viewing position of the series of viewing positions;

moving the cursor in one of the displayed three dimensional images;

simultaneously moving the image selection button relative to the movement of the cursor; and selecting one of the image selection buttons in the last viewing position of the series of viewing positions, wherein selecting the image selection button displays one of the viewing positions of the series of viewing positions; and displaying the three dimensional image associated with the selected image selection button.

7. The medium of claim 6 wherein the executed instructions further cause the system to perform displaying the image selection button further comprises displaying the image selection button underneath the cursor.

8. The medium of claim 6 wherein the executed instructions further cause the system to perform not displaying the image selection buttons after a period of times has elapsed.

9. The medium of claim 6 wherein the executed instructions further cause the system to perform displaying the image selection buttons in response to an action performed by a user.

10. The medium of claim 6 wherein the executed instructions further cause the system to perform receiving signals from a user input device; and moving the cursor in response to the received signals.

11. An apparatus comprising:

means for displaying a plurality of three dimensional images in a first viewing position of a series of viewing positions;

means for displaying a cursor in each viewing position of the series of viewing positions;

means for displaying at least one image selection button in a last viewing position of the series of viewing positions, wherein each image selection button is associated with one of the viewing positions of the series of viewing positions;

means for displaying at least one of the plurality of three dimensional images in the last viewing position of the series of viewing positions;

means for moving the cursor in one of the displayed three dimensional images;

means for simultaneously moving the image selection button relative to the movement of the cursor; and means for selecting one of the image selection buttons in the last viewing position of the series of viewing positions, wherein selecting the image selection button displays one of the viewing positions of the series of viewing positions; and displaying the three dimensional image associated with the selected image selection button.

12. The apparatus of claim 11 further comprising means for displaying the image selection button underneath the cursor.

13. The apparatus of claim 11 further comprising means for not displaying the image selection button after a period of times has elapsed.

14. The apparatus of claim 11 further comprising means for not displaying the image selection button in response to an action performed by a user.

15. The apparatus of claim 11 further comprising means for receiving signals from a user input device; and means for moving the cursor in response to the received signals.

* * * * *

UNITED STATES PATENT AND TRADEMARK OFFICE
CERTIFICATE OF CORRECTION

PATENT NO. : 6,271,854 B1
DATED : August 7, 2001
INVENTOR(S) : Light

It is certified that error appears in the above-identified patent and that said Letters Patent is hereby corrected as shown below:

Column 3,
Line 32, delete "10" after "processor", insert -- 110 --.

Signed and Sealed this

Fourth Day of June, 2002

Attest:

Attesting Officer

JAMES E. ROGAN
Director of the United States Patent and Trademark Office